United States Patent [19]
Wei

[11] Patent Number: 5,536,337
[45] Date of Patent: *Jul. 16, 1996

[54] METHOD FOR HEAT TREATING A METAL COMPONENT

[75] Inventor: Daniel C. Wei, Ann Arbor, Mich.

[73] Assignee: Hayes Wheels International, Inc., Romulus, Mich.

[ * ] Notice: The term of this patent shall not extend beyond the expiration date of Pat. No. 5,340,418.

[21] Appl. No.: 294,167

[22] Filed: Aug. 22, 1994

Related U.S. Application Data

[63] Continuation-in-part of Ser. No. 23,294, Feb. 26, 1993, Pat. No. 5,340,418, which is a continuation-in-part of Ser. No. 842,942, Feb. 27, 1992, abandoned.

[51] Int. Cl.$^6$ ........................................................ C22F 1/04
[52] U.S. Cl. ............................ 148/549; 148/508; 148/511; 148/698; 148/702; 266/80; 266/87; 266/99; 266/249; 266/259; 374/153
[58] Field of Search ...................................... 148/508, 511, 148/549, 698, 702; 266/80, 87, 99, 249, 259; 374/153

[56] References Cited

U.S. PATENT DOCUMENTS

| | | | |
|---|---|---|---|
| 3,953,247 | 4/1976 | Elhaus et al. | 148/508 |
| 5,340,418 | 8/1994 | Wei | 148/549 |

FOREIGN PATENT DOCUMENTS 541353  5/1993  European Pat. Off. .

*Primary Examiner*—David A. Simmons
*Assistant Examiner*—Robert R. Koehler
*Attorney, Agent, or Firm*—MacMillan, Sobanski & Todd

[57] ABSTRACT

A method for heat treating a metal component uses a first heating system having a first high intensity heating portion to rapidly heat the component to a desired temperature and a second heating portion to maintain the component temperature for solution heat treatment. The heating system is an indexing-type system which includes a plurality of individual heating stations to effect solution heat treatment of the component. Following quenching, a second heating system having a first high intensity heating portion to rapidly heat the component to a desired temperature and a second heating portion to maintain the component temperature artificially ages the component.

31 Claims, 14 Drawing Sheets

METHOD FOR HEAT TREATING A METAL COMPONENT

CROSS REFERENCE TO RELATED APPLICATIONS

This application is a continuation-in-part of U.S. patent application Ser. No. 08/023,294, filed Feb. 26, 1993 now U.S. Pat. No. 5,340,418 which is a continuation-in-part of U.S. patent application Ser. No. 07/842,942, filed Feb. 27, 1992, now abandoned.

BACKGROUND OF THE INVENTION

This invention relates in general to the manufacture of metal components and, in particular, to an improved method for heat treating a metal component.

Metal components, such as light weight metal vehicle wheels, are typically formed by conventional casting or forging processes. It is generally necessary, after the initial casting or forging operation, to subject the component to a heat treatment process in order to produce a product having the desired tensile strength, yield strength, elongation, and fatigue strength properties. One such heat treatment process includes: (1) a "solution heat treatment" (SHT) process and (2) an "aging" (i.e., precipitation hardening) process.

In the SHT process, the metal component is first heated to a "solution" temperature of about 1000° F. for a predetermined time period such that certain soluble constituents contained in the metal (such as age hardening constituent magnesium silicide $Mg_2Si$) are dissolved into "solid solution". The component is then immediately and rapidly cooled (such as by quenching in a water bath) to retain the constituents in solid solution. This prevents rapid precipitation of the associated constituents which would otherwise occur if the component were allowed to slowly cool through a certain temperature range.

During the "aging" process, the hardening constituents are precipitated out of the solution in a controlled manner to produce a product having the desired mechanical properties. The aging is effected either "naturally" at room temperature over a period of at least 10–12 hours, or it can be "accelerated" by heating the product to an elevated temperature for a shorter period of time (e.g. 450° F. for 30 minutes).

The conventional process for producing gravity-cast metal components includes initially pouring a suitable molten metal alloy, such as A356 aluminum, into a mold through its gate channel until the molten metal alloy flows upwardly through one or more mold risers. After the molten metal alloy has completely solidified, the component casting is removed from the mold, at which time it can be degated (i.e., the portion of the casting which solidified in the gate channel is cut off) and quenched in water to cool the casting to room temperature. The casting is then derisered (i.e., the riser portions of the casting are removed) and subjected to fluoroscope inspection to locate any obvious casting defects.

The conventional process for producing forged metal components includes a series of pressing operations using a plurality of dies to gradually form the wheel. Initially, a heated billet of a suitable metal alloy, such as 6161 or 2014 aluminum, is placed into a first open die set. The die set is closed with a high pressure press, squeezing the heated billet into the shape of the die cavity. The forging is removed from the die set and placed in a second die set which is then closed. The process is repeated, which each successive die set progressively further shaping the billet until the final component shape is achieved. If necessary, the billet is reheated between forging operations.

Additionally, semi-solid forging can be used to form a metal component. Semi-solid forging involves placing a heated billet of a suitable metal alloy, such as A357 aluminum, into a single open die set. The die set is closed with a high pressure press, squeezing the heated billet into the final shape of the wheel. The forging is removed from the die set and can be subjected to fluoroscope inspection to locate any obvious forging defects.

Next, a group of components (typically between about 70 and 350), are loaded onto racks and subjected to a "batch" solution heat treatment process. The batch solution heat treatment process is effected by placing the racks in a large gas-fired or electrical-resistance forced air convection oven. In the convection oven, the components are heated to a desired "solution" temperature (approximately 1000° F.) and are maintained at this temperature for approximately 2 to 8 hours. Following heating, the batch of components are immediately quenched in water to rapidly cool the components. Following cooling, the components are typically subjected to finishing operations. Finishing operations can include machining and painting and/or clear coating, during which time the components are naturally aged at room temperature.

One of the problems associated with the above method for producing metal components relates to the amount of "work-in-process" which occurs as a result of the long process times. It is known that once a metal component is heated to the correct "solution" temperature, proper solution heat treatment will occur within about 5 minutes. However, since a large number of components are heated during the batch solution heat treatment process, it is difficult to maintain even and uniform temperatures in all the components. Thus, to ensure that all the components are properly heat treated, the time to solution heat treat the components is usually at least two hours.

With respect to metal alloy vehicle wheels, the above described series of steps, beginning with the forming of the wheel and through both the solution heat treatment and aging processes, require at least 12 hours. More realisticly, the steps take closer to about 24 hours. Thus, any defect in the wheels (which is typically located during machining) is not readily discoverable until a relatively large number of wheels are "in process". As a result, a large number of wheels can be produced before a casting or forging defect is discovered. In addition, since the wheels are cooled to room temperature prior to being solution heat treated, additional energy (and time) is needed to reheat the wheels to the specific temperature necessary for solution heat treatment.

One alternate method for heat treating aluminum alloy castings, such as a piston, is disclosed in U.K. Patent No. 390,244. According to the method of this patent, an aluminum alloy material is cast in a mold and removed from the mold while the temperature is above 662° F. (350° C.). The casting is immediately placed in an oven maintained at a specific elevated temperature in the range of 788° to 968° F. (420° to 520° C.), and remains in the oven for a time period between 10 and 30 minutes. Following heating, the casting is quenched in water, and then either naturally or artificially aged.

Other methods for heat treating a cast component of aluminum alloy material are disclosed in U.S. Pat. Nos. 4,420,345 and 4,419,143, both issued to Ito et al. According to the methods in these patents, an aluminum-silicon-magnesium alloy or an aluminum-silicon-copper-magnesium alloy containing 0.03 to 1.0% by weight of antimony is cast into a mold. Then, after the casting has completely solidified but before the temperature has fallen below 842° F. (450° C.), the casting is placed in a heating furnace maintained at a specific elevated temperature in the range of 896° to 1022° F. (480° to 550° C.), for a time period of less than 2 hours. Following heating, the casting is quenched in water and then subjected to an artificial aging process at a specific elevated temperature for less than 12 hours.

The methods disclosed in all of the above patents reduce the time to solution heat treat the cast aluminum article by not allowing the casting to cool below a certain temperature before initiating solution heat treatment. However, they all still utilize forced air convection furnaces to solution heat treat and/or artificially age the castings. Some drawbacks of forced air convection furnaces include lengthly heat-up time before reaching processing temperature, difficulty in obtaining uniform temperature distribution, and sometimes inconsistent product quality.

Recently, electric infrared (IR) heating systems have received increasing attention in certain industrial applications. In an infrared heating system, a product is heated by generating electromagnetic radiation waves at a specific frequency and intensity, and directing these waves at the product. The particular frequency (i.e., wavelength) and intensity are selected in accordance with the particular heating requirements of the product. While infrared heating systems are used in a variety of different industrial applications, they are primarily used to dry and/or cure products with layers or thin films on their surfaces.

SUMMARY OF THE INVENTION

This invention relates to an improved method for heat treating a metal component wherein high intensity heaters are used to initially rapidly heat the component to a temperature within a predetermined temperature range.

A first heating system is used to effect heat treatment of the metal component. The first heating system includes a first portion having high intensity heaters, such as high intensity electric infrared emitters and a second portion having conventional heating means, such as gas-fired forced air convection heating. The high intensity heaters in the first portion rapidly heat the component to a temperature in a predetermined heat treatment range. The component is then moved to the second portion where the conventional heating means maintains that temperature for a predetermined period of time. Preferably, a plurality of components are indexed through a series of separate heating stations for individually heating each component.

Each heating station includes means for monitoring the actual temperature of the component, and the heating of the component at each station is controlled in accordance with its monitored temperature. One method of control includes monitoring the component temperature during the initial rapid heating. The heat energy supplied to the component is reduced when the component temperature reaches a predetermined temperature in the heat treatment temperature range. An alternate control method includes measuring an initial component temperature. Based upon the initial component temperature, an initial rapid heating period is determined. When the initial heating period ends, the heat energy supplied to the component is reduced. Also, for future reference, the heating temperatures and times for each component can be recorded.

Immediately after the heat treatment, the component is quenched in water. After this quenching operation, a second heating system can be used to effect accelerated artificial aging of the component. Similar to the first heating system, the second heating system includes a first portion having high intensity heaters, such as high intensity electric infrared emitters and a second portion having conventional heating means, such as gas-fired forced air convection heating. The high intensity heaters in the first portion rapidly heat the wheel to a temperature in an aging treatment range. The component is then moved to the second portion where the conventional heating means maintains that temperature for a predetermined period of time. Preferably, a plurality of components are indexed through a series of separate heating stations for individually heating each wheel. Following aging, the component is finished, if needed, by machining and/or coating.

This method of heat treating improves the manufacturing efficiency normally associated with producing metal components, such as aluminum alloy vehicle wheels. With the method, a finished vehicle wheel can be completed in approximately 30 to 60 minutes after the initial casting operation. Thus, the amount of "work-in-process" is substantially reduced.

Alternately, the metal component can be aged naturally or by using a conventional aging method following solution heat treatment.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
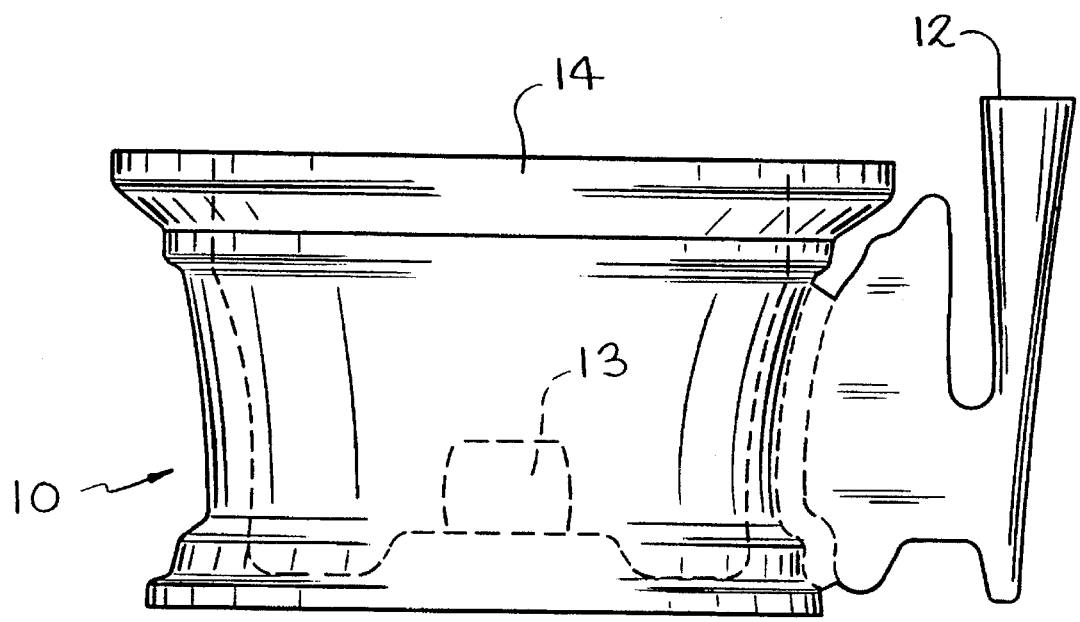
FIG. 1 is an elevational view of a metal alloy wheel casting (shown with its outboard side facing downwardly) which is heat treated in accordance with this invention.

Referring now to the drawings, there is illustrated in FIG. 1 an elevational view of a typical gravity cast light weight metal alloy vehicle wheel, indicated generally at 10, which can be heat treated in accordance with the method of this invention. It will be appreciated that the invention can be practiced to heat treat any metal component and that the vehicle wheel 10 is shown as being illustrative of the invention.

When the wheel 10 is gravity cast, a molten metal alloy is poured into the associated mold (not shown) through a channel to form a gate 12 and, as the mold cavity is filled, the molten metal flows upwardly into a center riser 13 and a rim (or side) riser 14. It will be appreciated that, while the invention is illustrated and described herein in conjunction with a wheel formed by the gravity casting method, the invention can be used with other casting methods such as, for example, low pressure, squeeze, pore free, and die casting. With these other methods, the wheel 10 would be cast without a gate 12 or risers 13 and 14.

The metal alloy wheel also can be formed with a conventional forging or semi-solid forging process. Forging utilizes a plurality of die sets (not shown), each die set having a movable member and a fixed member. The movable member is movable relative to the fixed member between open and closed positions. When in the closed position, the die set defines a die cavity which is used to forge the wheel. To forge a wheel, a heated billet of suitable metal alloy is inserted into the open die set. The die set is closed with a high pressure press, squeezing the heated metal billet into the shape of the die cavity. The forging is removed from the die set and placed in a second die set which is then closed. The process is repeated, which each successive die set progressively further shaping the billet until the final wheel shape is achieved. If necessary, the billet is reheated between forging operations.

Semi-solid forging involves placing a heated billet of a suitable metal alloy, into a single open die set. The die set is closed with a high pressure press, squeezing the heated metal billet into the final shape of the wheel. The forging is removed from the die set and can be subjected to fluoroscope inspection to locate any obvious forging defects. A forged wheel does not have risers or gates and thus does not require derising or degating.

Additionally, the wheel 10 can be wrought, extruded, or formed by any other conventional method.

It will be further appreciated that, while the drawings and description herein show producing a "one piece" wheel 10, the invention can be practiced to form only a component of a multi-piece wheel such as, for example, a center spider portion (not shown), which is then secured to a separately formed rim (not shown) in a known manner to form the finished wheel. The component can also be the full front face of the wheel which is subsequently secured to a formed partial rim. Thus, as used in this description and the following claims, the term "wheel" includes not only a one piece wheel, but also a component of a multi-piece wheel.

For illustrative purposes, the wheel 10 is described in the following as being cast from a suitable aluminum casting alloy material such as, for example, A356 aluminum. It will be appreciated that the invention can be used to heat treat wheels and metal components formed from other metals, such as cast steel, magnesium, titanium and alloys thereof. A356 aluminum generally includes approximately, by weight, 6.0 to 7.5% silicon, 0.25 to 0.45% magnesium, about 0.20% iron, about 0.20% titanium, 0.008 to 0.04% strontium, and the balance aluminum. The term balance aluminum is intended to include residual amounts of other elements which may be present in the alloy material, such as manganese, copper, calcium, antimony, zinc, barium, carbon, zirconium, and sodium. The strontium is used as a casting modifier to lower the required solution heating time. Other suitable casting alloys include A333 or A357 aluminum, magnesium, or titanium. Suitable aluminum forging materials include 2014 and 6161, while aluminum alloys suitable for semi-solid forging include A357.

Figure 2:
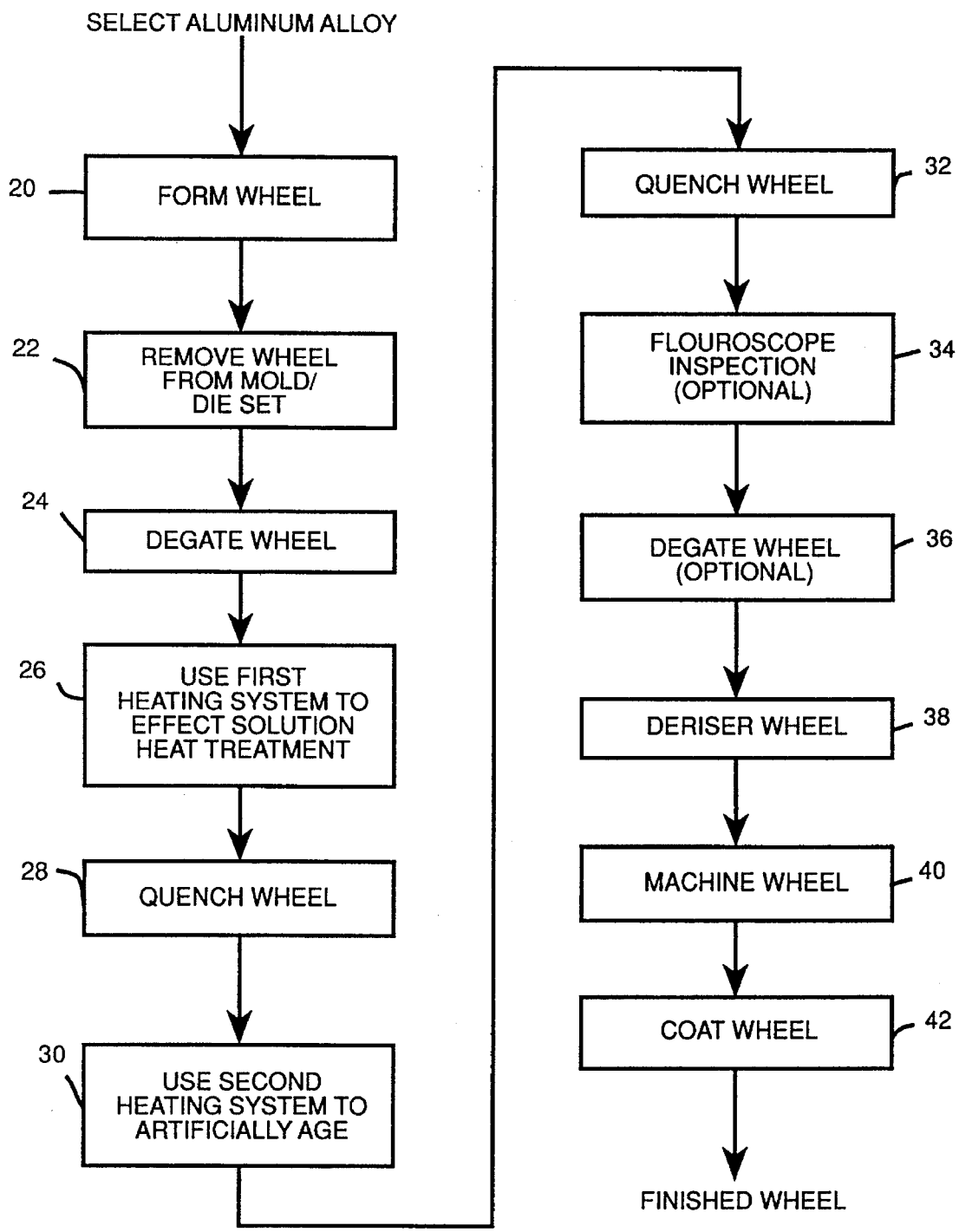
FIG. 2 is a block diagram showing the steps of the method of this invention.
Figure 3:
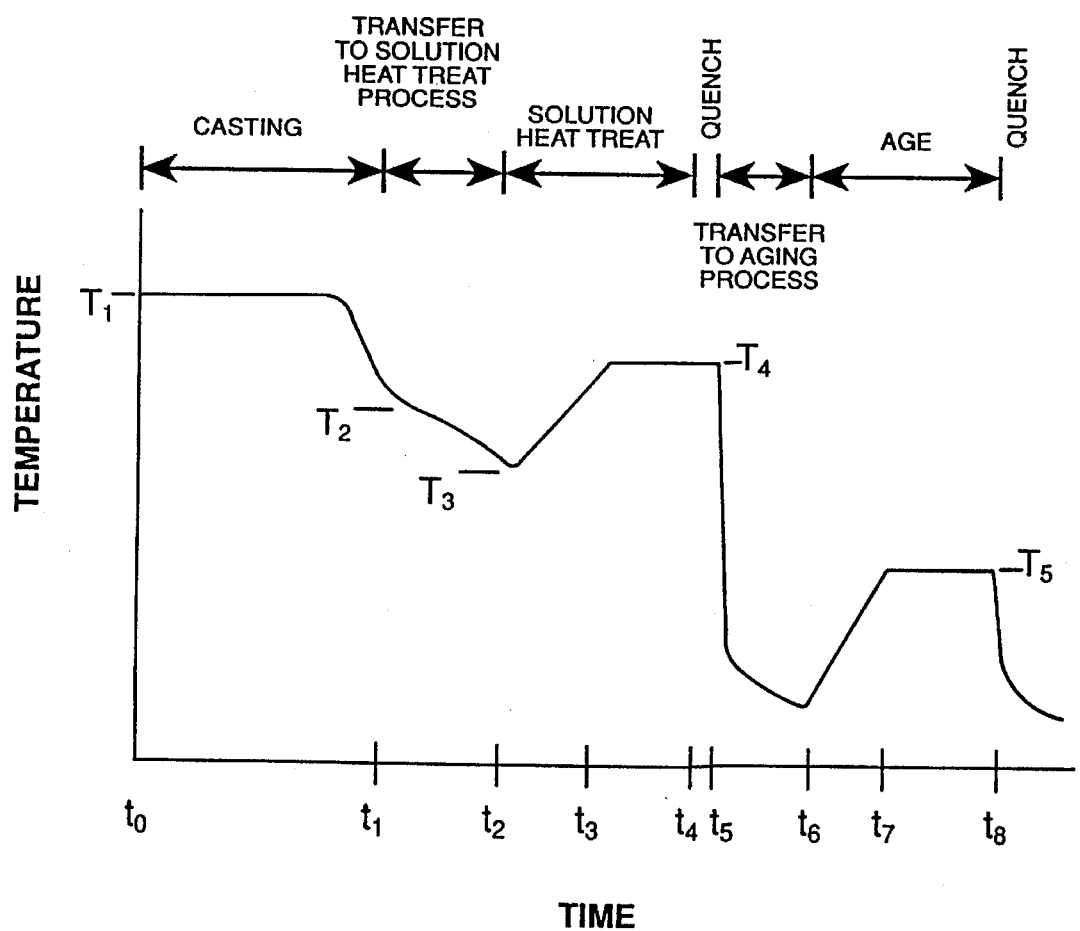
FIG. 3 is a graph illustrating the time-temperature parameters preferably followed by the method of this invention.

Turning now to FIGS. 2 and 3, the particular method of this invention will now be discussed. Initially, in step 20, an aluminum wheel is formed using a conventional process. One conventional process for forming a wheel is casting, wherein molten aluminum alloy at a temperature $T_1$ (about 1300° F.) is poured into a gravity type mold (not shown) at time $t_0$ to form a casting having roughly the desired final shape of the wheel 10. The wheel 10 remains in the mold until its temperature has fallen sufficiently to prevent any "center pull" wheel deformation when the wheel 10 is removed therefrom (shown in FIG. 3 as temperature $T_2$ at time $t_1$), and is then immediately subjected to a solution heat treat process prior to its temperature falling to a point where significant precipitation of the hardening constituents has occurred (shown as temperature $T_3$ at time $t_2$). "Center pull" deformation occurs when the temperature of the wheel has not cooled sufficiently to allow the wheel to be pulled from the mold/die set without deforming its shape. While the particular temperature may vary depending on the particular construction of the casting, it has been found that, in most instances, the temperature $T_2$ of a typical wheel 10 formed from A356 aluminum must fall below about 800° F. to prevent "center pull" deformation. For a cast wheel, in step 22, when the wheel 10 is removed from the mold, the gate 12 and the risers 13 and 14, shown in FIG. 1, remain as part of the casting.

When a casting process is used to form the wheel, it is preferable to degate the wheel 10 after the wheel 10 has been removed from the mold, in step 24, and then initiate an SHT process, in step 26, as soon as possible thereafter and prior to significant precipitation of the age hardening constituents (e.g., $Mg_2Si$) in the hot casting. However, as will be discussed below, the solution heat treatment of the wheel 10 can be initiated with the gate 12 remaining on the wheel 10, and the gate can be later removed.

As described above, other conventional processes for forming a wheel include forging and semi-solid forging. Both processes involve placing a heated aluminum billet in a die set. The die set is closed, squeezing the aluminum billet into a desired shape.

Depending upon the particular percentages of magnesium and silicon in the wheel 10, it is preferable that the temperature $T_3$ at time $t_2$ be no less than about 400° F. (204° C.) before SHT is initiated. Normally, in order to maintain the desired temperature of the wheel 10, the time between removal from the mold or die in step 22 (at time $t_1$) and the initiation of the SHT process in step 26 (at time $t_2$) is less than about 2 minutes.

In accordance with one feature of this invention, in step 26, a first heating system is used to effect individual heat treatment of the wheel 10. In the following, the specific process of solution heat treatment and artificial aging of a wheel 10 is described to illustrate the invention. However, it will be appreciated that the invention can be practiced with other heat treating processes. In the preferred embodiment of the invention, the first heating system includes a first portion having high intensity electric infrared emitters and a second portion having gas-fired forced air convection heaters. However, it will be appreciated that other sources of heat energy can be used. For example, the first portion can include gas-fired infrared emitters or induction heating and the second portion can include electric resistance heating units, induction heating, or infrared emitters.

In step 26, the infrared emitters in the first portion of the heating system initially rapidly heat the wheel 10 to a desired solution temperature $T_4$ within a time interval $t_2$ to $t_3$. Generally, the temperature $T_4$ is in the range of 980° to 1025° F. (527° to 552° C.), and the time interval $t_2$ to $t_3$ is approximately 1–4 minutes, depending on the initial temperature of wheel and the infrared heating rate. Once the wheel 10 reaches the desired temperature $T_4$, the wheel is moved to the second portion of the heating system where the wheel 10 is maintained at the temperature $T_4$ for a time interval $t_3$ to $t_4$, which is about one to ten minutes. Preferably, for a wheel formed from A356 aluminum, the temperature $T_4$ is approximately 1000° F. (538° C.), the time $t_2$ to $t_3$ is about 1–2 minutes, and the time interval $t_3$ to $t_4$ is approximately 3–4 minutes. Thus, the total time interval $t_2$ to $t_4$ is about 5 minutes.

After completion of the solution heat treatment in step 26, the wheel 10 is immediately transferred to a water bath in step 28 within a time interval $t_4$ to $t_5$. Preferably, the time between completion of solution heat treatment in step 26 and commencement of quenching in step 28, is less than 10 seconds. In step 28, the wheel 10 is quenched in the water bath, and is then transferred to an accelerated artificial aging process in step 30, within a time interval $t_5$ to $t_6$. Preferably, the time interval $t_5$ to $t_6$ is around 45 seconds such that the total time interval $t_4$ to $t_6$, which represents the time between completion of solution heat treatment and commencement of artificially aging, is approximately 1 minute. The water bath is preferably maintained at a temperature in the range of 120° to 220° F. (48° to 104° C.).

In accordance with yet another feature of this invention, after the wheel 10 has been quenched in the water bath in step 28, a heating system, in step 30, is used to effect the accelerated artificial aging process. In the preferred embodiment of the invention, the second heating system is similar to the first heating system and includes a first portion having high intensity electric infrared emitters and a second portion having gas-fired forced air convection heaters. However, it will be appreciated that other sources of heat energy can be used. For example, the first portion can include gas-fired infrared emitters or induction heating and the second portion can include electric resistance heating units, induction heating, or infrared emitters.

Preferably, the artificial aging occurs immediately after the quenching of step 28. In step 30, the infrared emitters in the first portion of the heating system initially rapidly heat the wheel 10 to a desired aging temperature $T_5$ in a time interval $t_6$ to $t_7$. Once the wheel 10 reaches the desired temperature $T_5$, the wheel is moved to the second portion of the heating system where the wheel 10 is maintained at the temperature $T_5$ for a time interval $t_7$ to $t_8$. The temperature $T_5$ is in the range of 400° to 500° F. (204° to 260° C.), the time interval $t_6$ to $t_7$ is approximately 1–4 minutes, and the time interval $t_7$ to $t_8$ is approximately one to ten minutes. Preferably, the temperature $T_5$ is about 450° F., the time interval $t_6$ to $t_7$ is 1–2 minutes, and the time interval $t_7$ to $t_8$ is about 3–4 minutes, such that the total time interval $t_6$ to $t_8$ is around 5 minutes.

Immediately following the artificial aging process in step 30, the wheel 10, in step 32, is quenched in a water bath to cool the wheel for normal handling. After quenching, the wheel can be subjected to fluoroscope inspection, in step 34, to determine if the wheel 10 has any obvious casting defects. Following fluoroscope inspection, if the wheel 10 has not been degated in step 24 prior to being solution heat treated in step 26, the wheel 10 is degated in step 36 to remove the gate 12 from the casting. In step 38, the risers 13 and 14 are removed from the wheel 10. Following step 38, the wheel 10 is machined as necessary into its final desired shape. Finally, in step 42, the wheel 10 is clear coated (and/or painted if so desired), to produce the finished cast aluminum wheel.

In the preferred embodiment, the portion of the process beginning at time $t_1$ and through the accelerated artificial aging of the wheel 10 and quenching in step 32 at time $t_8$, can be completed in less than 30 minutes and preferably, in less than 15 minutes. Since generally the time between step 30 and the machining in step 40 is less than about 30 minutes, a completed wheel, ready for coating, can be produced in less than 45 minutes. Thus, the use of infrared heating to initially rapidly heat the wheel 10 in both solution heat treat and artificial aging greatly reduces the process time as compared to the prior art methods. As a result, any defects in a wheel can be discovered before a large quantity of wheels have been produced. Further, the use of the infrared heating have been found to produce more uniform and consistent mechanical properties in the wheels.

It will be appreciated that, while the preferred embodiment includes rapid initial heating of the wheel 10 for both the solution heat treatment and the artificial aging of the wheel 10, the invention can also be practiced using the rapid initial heating for only the solution heat treatment or the artificial aging of the wheel 10.

Figure 4:
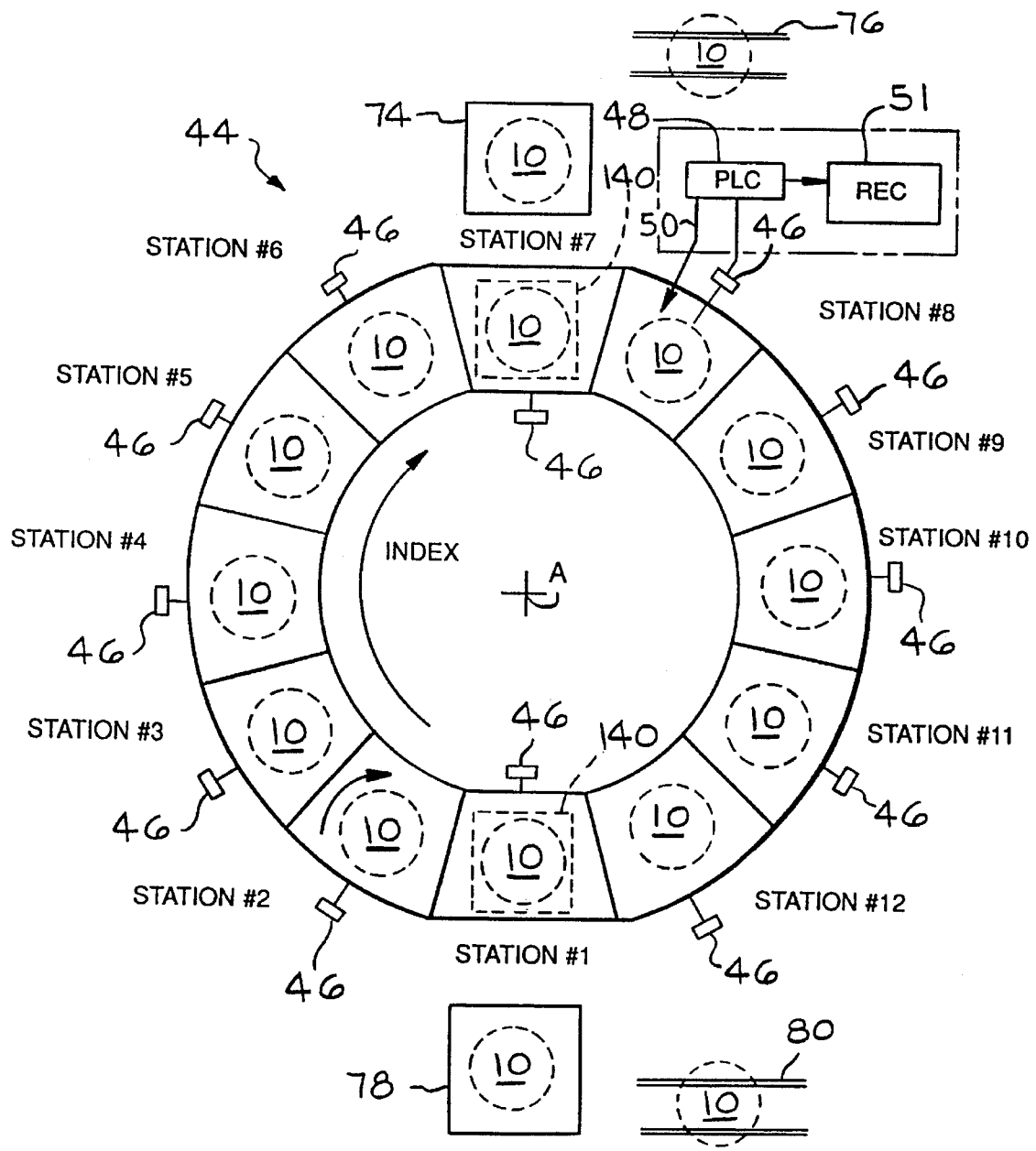
FIG. 4 is a top plan view of an integrated heating system used in heat treating a metal component according to the method of this invention.

Turning now to FIG. 4, there is shown an example of an integrated heating system, indicated generally at 44, which can be used to both solution heat treat and artificially age the cast aluminum alloy wheel 10. As shown therein, the heating system 44 is an indexing type carousel arrangement and includes stations #1 through #12 for processing the wheel 10. The system 44 includes an indexing unit (not shown) for individually advancing wheels through the system at a predetermined rate. As will be discussed, stations #2 through #6 are operative to effect solution heat treat of the wheel 10, while stations #8 through #12 are operative to effect accelerated artificial aging of the wheel 10.

Initially, an individual wheel 10 is loaded onto the indexing unit at station #1. The indexing unit rotates about an axis A and maintains a single wheel at each station for approximately 55–60 seconds, with an indexing time from one station to the next of less than three seconds. Accordingly, the total time required to index a wheel through the integrated infrared heating system 44 in order to both solution heat treat and artificially age the wheel, is less than 13 minutes.

Each of the stations #1 through #6 and #8 through #12 is provided with a separate means for sensing the actual temperature of the wheel at the respective station, such as temperature sensors 46. It has been found preferable to use one or more optical pyrometers at each station as the means for detecting the actual wheel temperature. Each temperature sensor 46 generates a signal representative of the temperature of the wheel 10 at the respective station. The temperature sensors are connected to a control unit 48 which, as will be discussed, functions to separately control the heating of the wheel at each heating station. In FIG. 4, stations #2–#6 and #8–#12 are heating stations. Stations #2, #3, #8 and #9 are provided with high intensity infrared heating ovens similar to that shown in FIG. 5. Stations #4–#6 and #10–#12 are gas-fired convection heating ovens. It will be appreciated that the number of each type of heating station included in the heating system 44 can vary in accordance with the specific application for which the heating system 44 was designed.

The control unit 48 is operative to control the heating at each individual station by generating controlled power signals on lines 50 (one shown in FIG. 5) to a plurality of electric infrared emitters 52 (shown in FIG. 5) in the high intensity heating ovens. The control unit 48 also is operative to control the temperature of the convection heating ovens. As will be described below, the heating stations are controlled in response to the monitored temperature of the respective wheel, and the desired heating phase of the process. In addition, the control unit 48 generates a signal to a recorder (REC) 51. The recorder 51 is operative to maintain an individual record of the heating temperatures and times of each wheel as the wheel is indexed through the system 44. Thus, if a wheel (which is later machined and coded with an identifying number) is found to be defective as a result of the heat treating process, the recorder 51 can be used to identify the specific time/temperature profile for that wheel and then identify any other wheels heated with similar profiles. As a result, the recorder 51 can quickly identify those wheels which were heated at the same temperatures as the defective wheel, and only the identified wheels need initially be checked for possible defects.

Figure 5:
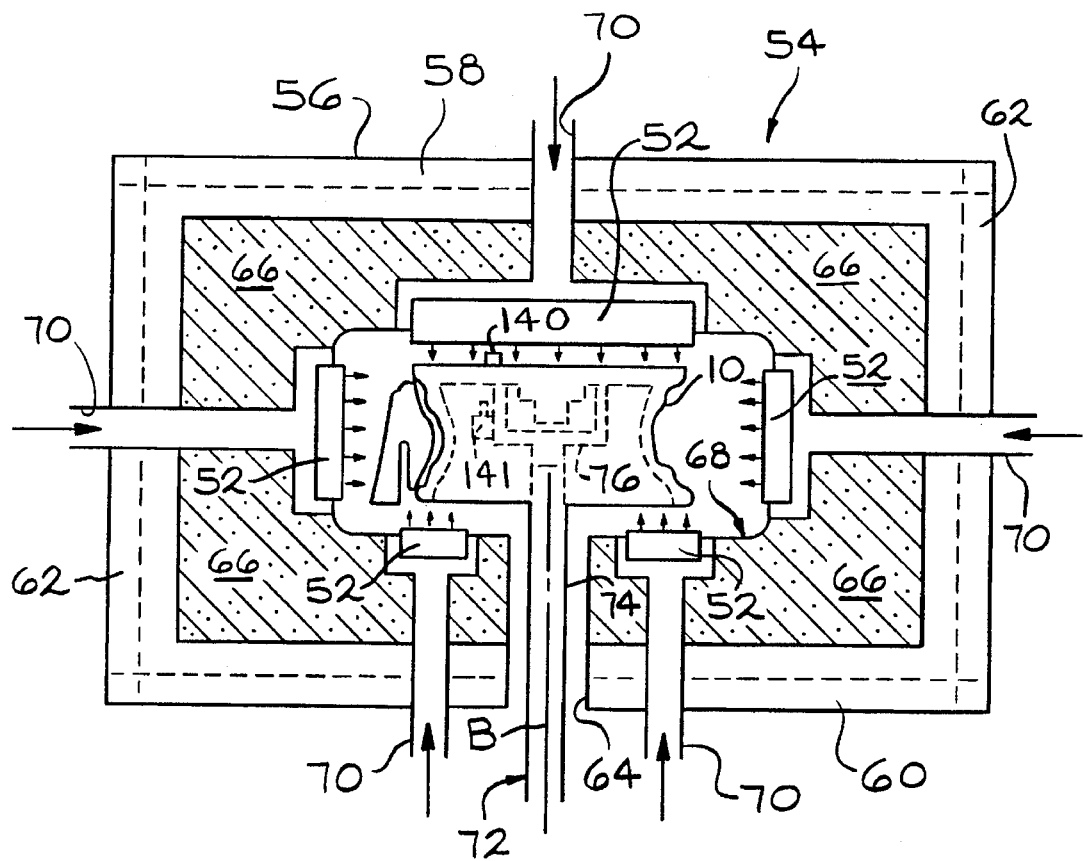
FIG. 5 is a partial cross sectional view taken along the line 5—5 of FIG. 4 and showing one of the individual high intensity heating stations.

As previously mentioned, the solution heat treat process is commenced as quickly as possible after the casting operation, and preferably the wheel 10 is indexed to station #2 before its temperature has fallen below 700° F. At this point, a high intensity electric infrared heating oven 54, which is best shown in FIG. 5, is actuated to begin to heat the wheel 10 to the temperature necessary to effect solution heat treatment. The high intensity electric infrared heating oven 54 includes a generally rectangular shaped enclosure 56 having an upper wall 58, a lower wall 60, and two side walls 62. The lower wall 60 is provided with an opening 64 formed therein.

The plurality of high intensity electric infrared emitters 52 are disposed within the enclosure 56 for generating infrared radiation in order to heat the wheel 10 in the desired manner. The emitters 52 are located near the upper wall 58, each of the side walls 62, and the lower wall 60 of the oven 54 on opposite sides of the opening 64. In the preferred embodiment, the high intensity electric infrared emitters 52 can be tungsten filament quartz lamps with 100 watt per inch power density. If necessary the emitters 52 can be grouped into a plurality of individual zones, and the heating of each zone can be separately controlled.

As shown in FIG. 5, the interior of the enclosure 56 is lined with insulation 66 to minimize the heat loss and increase the heating efficiency of each oven 54. A passageway 68 is provided in each enclosure 56 through which the wheel 10 is indexed. Also, appropriate ductwork 70 is provided in each enclosure 56 to supply cooling air to the emitters 52 to prevent them from overheating.

The indexing unit includes a plurality of spindle assemblies, one located at each station, which are rotatable about an axis B and extend upwardly through the opening 64 of the lower wall 60. The spindle assembly 72 includes a vertical shaft 74 having a bracket 76 releasably secured thereto for supporting the wheel 10. The bracket 76 is specially designed to support the particular wheel configuration. The spindle assembly 72 is coupled to a power rotating assembly (not shown) for rotating the wheel 10 (preferably at a speed of about 3–5 r.p.m.) about the axis B of the spindle assembly 72 as the wheel is being subject to infrared radiation at the respective heating station.

At station #2, the infrared emitters 52 begin to rapidly heat the wheel 10 at a rate of about 100° to 200° F. (43° to 93° C.) per minute. Normally, due to the initial temperature of the wheel when heating begins, and the indexing cycle of the system, the wheel will not reach the desired solution temperature at station #2. Thus, when the wheel 10 is indexed to station #3, it is heated at about the same rate until the temperature of the wheel 10 reaches the desired solution temperature in the range of 980° to 1025° F. (527° to 552° C.). Thereafter, the heat energy supplied by the infrared emitters 52 is reduced to maintain the temperature of the wheel at the desired solution temperature. The wheel 10 is indexed through convection heating stations #4–#6 which continue to maintain the temperature of the wheel at the desired solution temperature until the end of the solution heat treat cycle.

After the wheel 10 is indexed from station #6 to station #7, it is lifted from its associated spindle assembly 72, and is immediately quenched in a water tank 74. Immediately thereafter, the wheel 10 is returned to its spindle assembly 72 and is indexed to station #8 to begin an accelerated artificial aging process. Alternatively, the wheel 10 can be cooled to room temperature after is has been quenched at station #7 and then unloaded onto a conveyor 76 and then derisered, if necessary, machined, painted. The wheel 10 can be aged during or after the above finishing operations by the method of the present invention or by a conventional method, such as natural aging.

At station #8, the control unit 48, in response to the monitored temperature of the wheel, generates power signals to the associated infrared emitters to begin to heat the wheel at a predetermined rate (preferably at 100°–200° F. per minute) to the desired aging temperature which, as previously mentioned, is preferably in the range of 400° to 500° F (204° to 260° C.). Normally, due to the initial temperature of the wheel when heating begins, and the indexing cycle of the system, the wheel will not reach the desired aging temperature at station #8. Thus, once the wheel 10 is indexed to station #9, it continues to be heated at about the same rate until the desired aging temperature is reached. Thereafter, the control 48 accurately maintains the wheel at the desired aging temperature through convection heating stations #10–#12 until the completion of the aging process.

Finally, the wheel 10 is indexed from station #12 to station #1 and where it is lifted from the station and is quenched in a water tank 78 to cool the wheel for further handling. The wheel 10 is then placed on a conveyor 80 which transfers the wheel to a location wherein the additional operations of steps 34–42 can be performed.

11

Figure 6:
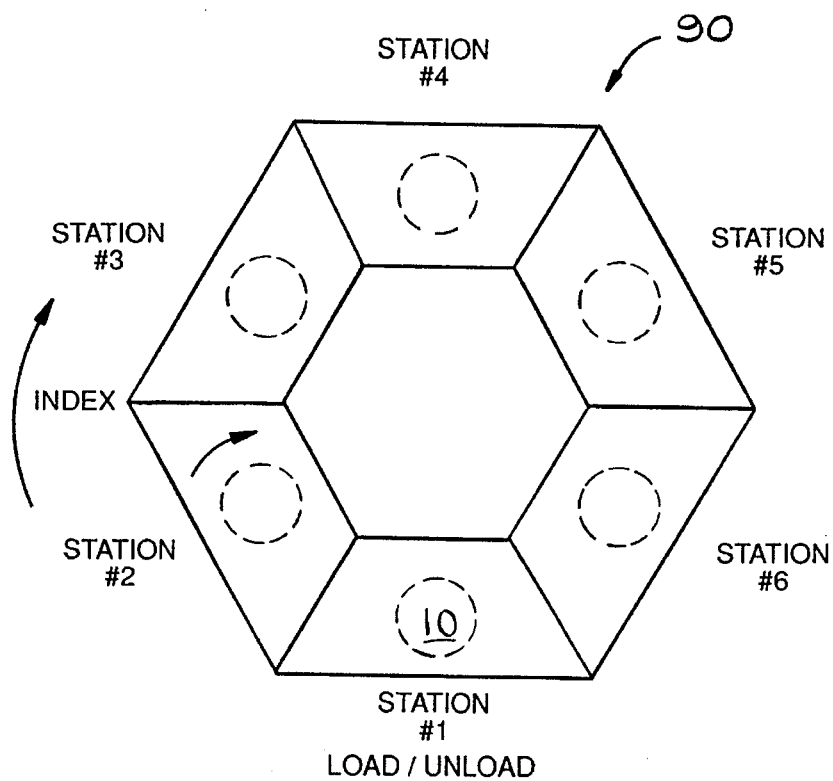
FIG. 6 is a schematic view of an alternate embodiment of a heating system which can be used in heat treating a metal component according to the invention.

FIG. 6 illustrates a schematic view of a further example of a heating system 90 which is similar to the heating system 44 shown in FIG. 4, except that it is not an integrated heating system. The heating system 90 includes high intensity electric infrared heaters for stations #2 and #3 and gas-fired convection heating for stations #4–#6. As shown in FIG. 6, the wheel 10 can be loaded at station #1 and indexed through heating stations #2 through #6 to effect either a solution heat treatment process or an accelerated artificial aging process of the wheel 10.

Figure 7:
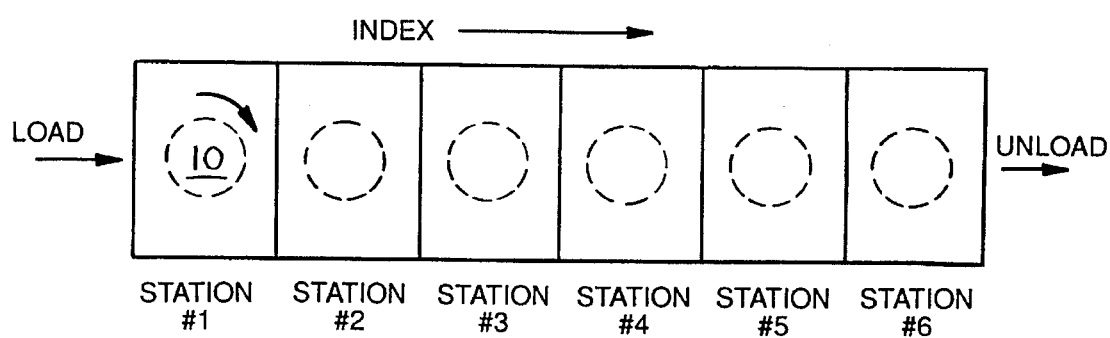
FIG. 7 is a schematic view of a further alternate embodiment of a heat treating system.

FIG. 7 illustrates a schematic view of yet a further example of a heating system 92 which is similar to the heating system 90 shown in FIG. 6, except that it is not configured in a carousel arrangement. The heating system 92 includes high intensity electric infrared heaters for stations #2 and #3 and gas-fired convection heating for stations #4–#6. As shown in FIG. 7, the wheel 10 can be loaded at station #1 and moved through heating stations #2 through #6, which are arranged in linear configuration, to effect either a solution heat treatment process or an accelerated artificial aging process of the wheel 10.

Several control methods are available to control the amount and application rate of heat energy applied to each wheel during the above described heat treating processes. One such control method consists of monitoring the wheel temperature, $T_W$, as a predetermined level of heat energy is applied to the wheel 10 to rapidly increase the temperature thereof. When $T_W$ reaches a predetermined temperature included within a predetermined temperature range, the amount of heat energy applied to the wheel 10 is reduced to maintain the wheel 10 within the predetermined temperature range. Because the actual temperature of the wheel is used to control the level of heat energy applied to the wheel, the control method constitutes a form of closed loop feedback control.

Figure 8:
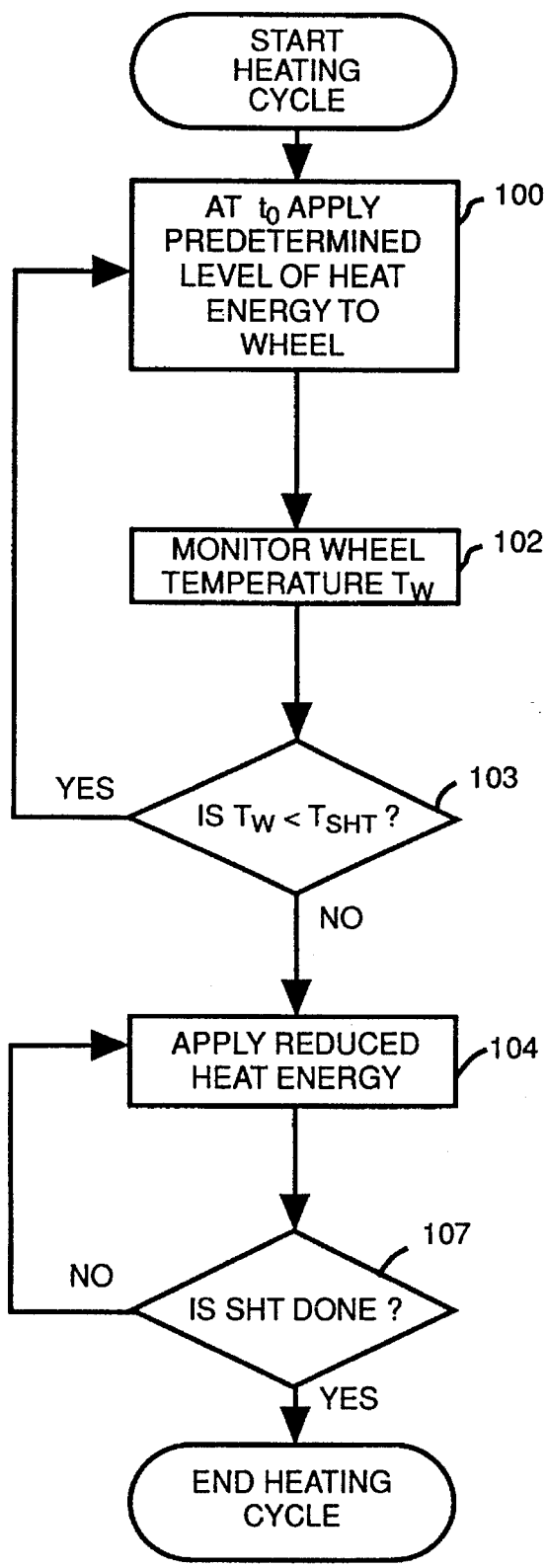
FIG. 8 is a flow chart for a closed loop control method for the heating system used in heat treating a metal component according to the invention.
Figure 9:
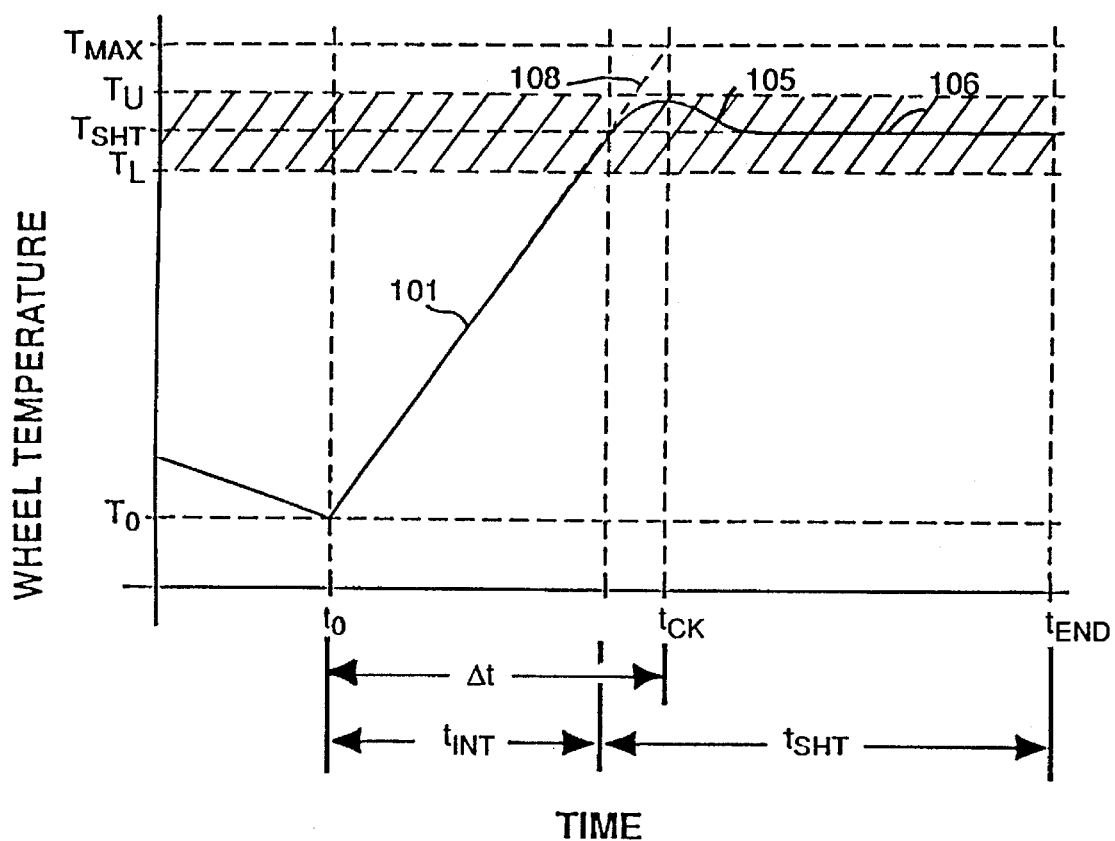
FIG. 9 is a temperature/time graph for the control method shown in FIG. 8.

The above described closed loop control method is illustrated by the flow chart shown in FIG. 8 and the temperature/time diagram shown in FIG. 9. FIG. 9 corresponds to the solution heat treatment portion of the graph shown in FIG. 3. For descriptive purposes, the control method is described in the following by referring to the infared heating system 44 shown in FIG. 4; however, the control method can be used with other heating systems.

As described above, the wheel 10 is loaded onto the indexing carousel at station #1 and indexed into heating station #2. Then, as shown in functional block 100 in FIG. 8, the control unit 48 causes the heating system 44 to provide an initial predetermined level of heat energy to the wheel 10, causing a rapid wheel temperature rise. This is accomplished by applying a voltage to the infared emitters 52 contained in station #2, beginning at time $t_0$. Typically, the maximum allowable voltage is applied to the emitters 52 to provide a maximum level of heat energy to the wheel 10.

The rapid temperature rise occurs during an initial heating time period, $t_{INT}$, as shown by a heating ramp portion 101 of the temperature/time diagram in FIG. 9. As the wheel 10 is heated, $T_W$ is monitored by the temperature sensors 46, as shown in functional block 102 in FIG. 8. In the preferred embodiment of the control method, the temperature monitoring is continuous, however, the control method also can include monitoring by sensing $T_W$ at a plurality of times separated by predetermined time intervals.

$T_W$ is supplied to the control unit 48 and, in decision block 103, compared to a predetermined solution heat treatment (SHT) temperature, $T_{SHT}$. $T_{SHT}$ can be varied and a particular value is stored in the control unit 48. The particular value used for $TSH_T$ is contained within a predetermined SHT temperature range. The SHT temperature range is shown as the horizontal shaded area in FIG. 9 and is bounded by a lower temperature value, $T_L$, and an upper temperature value, $T_U$. The particular SHT temperature range is typically narrow and a function of the particular aluminum alloy used to cast the wheel 10. As described above, a SHT temperature range for the aluminum alloy A356 from 980° F. (526° C.) to 1025° F. (552° C.) has been successfully used.

12

As long as $T_W$ is less than $T_{SHT}$, the wheel 10 continues to be heated at the initial predetermined level of heat energy provided by the infared emitters 52. Depending upon the particular wheel, it may be necessary to index the wheel through more than one of the heating system stations before $T_W$ reaches $T_{SHT}$.

When $T_W$ reaches $T_{SHT}$, the control unit 48 causes the voltage applied to the infared emitters 52 to be lowered. This reduces the heat energy provided by the emitters 52 to a lower predetermined level, as shown in functional block 104 in FIG. 8. Depending upon the tolerances of the sensors 46 and the control unit 48, $T_W$ may slightly exceed $T_{SHT}$ before the emitter voltage is reduced. After the emitter voltage is lowered, $T_W$ typically follows a transient, as shown at 105 in FIG. 9, during which $T_W$ continues to increase for a short time period and then decreases to a temperature within the SHT temperature range. It is to be appreciated that $T_W$ may exceed $T_U$ for a short period of time during the transient. The reduced heat energy level provided by the emitters 52 maintains $T_W$ at this temperature, as shown by a generally horizontal portion 106 of the temperature/time diagram in FIG. 9.

$T_W$ is maintained within the predetermined SHT temperature range for a predetermined solution heat treatment time period, $t_{SHT}$, extending from the end of $t_{INT}$ to a treatment end time, $t_{END}$. The time period $t_{SHT}$ can be determined from an empirical formula or from actual solution heat treatment experience. During $t_{SHT}$, the wheel 10 continues to be indexed through the heating system 44. The rate of indexing is adjusted to assure that the wheel 10 exits station #6 at $t_{END}$, as shown in decision block 107 in FIG. 8. The production of the wheel 10 then continues as described above.

Figure 10:
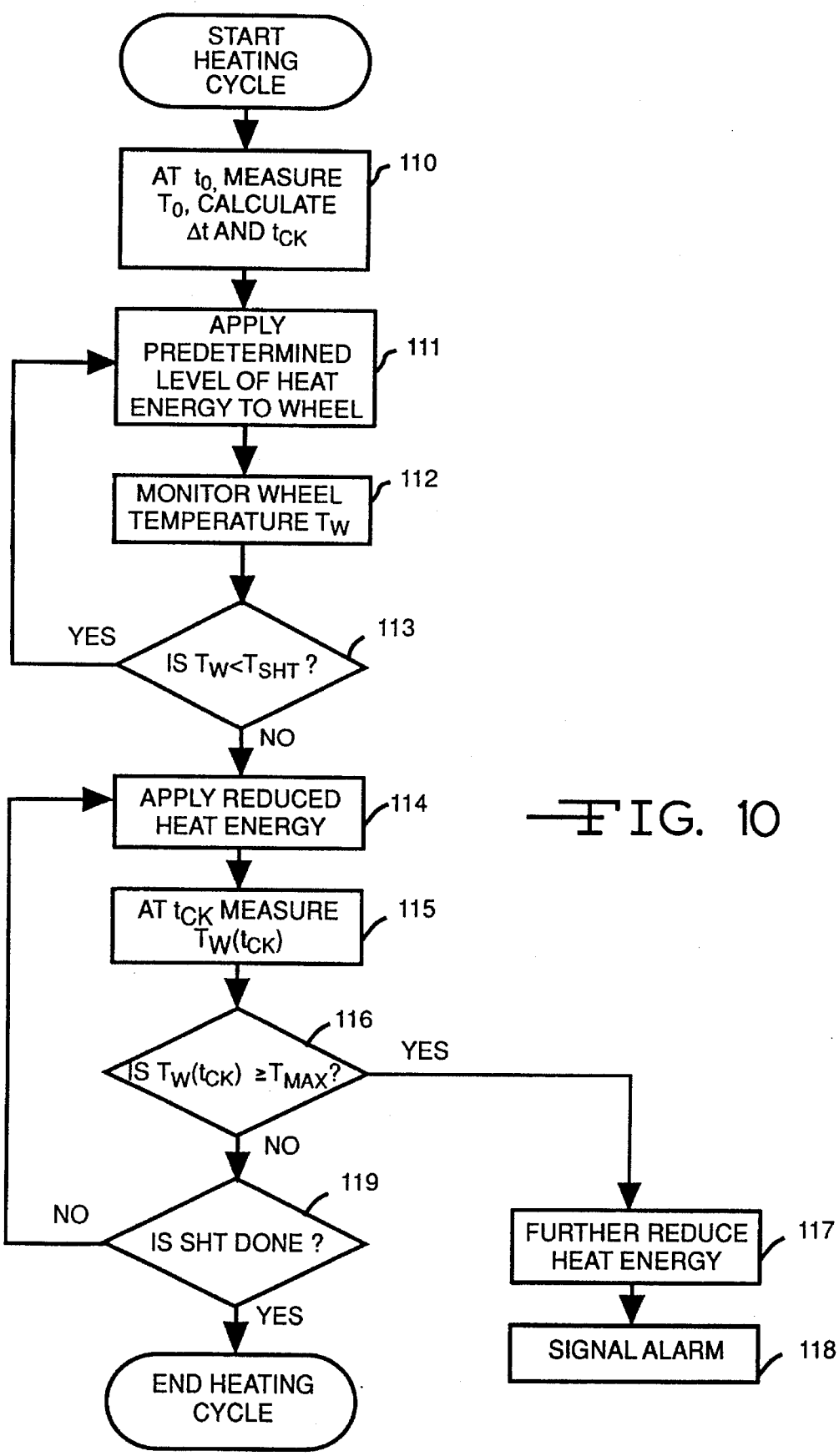
FIG. 10 is a flow chart for an alternate embodiment of the control method shown in FIG. 8.

A second embodiment of the above described closed loop control method is illustrated by the flow chart shown in FIG. 10. This embodiment includes comparing the wheel temperature, $T_W$, to a predetermined maximum temperature, $T_{MAX}$, at a time occurring subsequent to the reduction of the heat energy. The temperature comparison functions to preclude overheating the wheel 10 if the heating system 44 has malfunctioned. The value of $T_{MAX}$ is selected to be greater than $T_U$ and is illustrated in FIG. 9 by the upper dashed horizontal line. Typically, $T_{MAX}$ is 5 to 10° F. above $T_U$.

As shown in functional block 110 in FIG. 10, the initial temperature $T_0$ of the wheel 10 is measured at $t_0$. This may be done at either station #1 or #2 of the heating system 44. Because the initial predetermined heating rate, $r_{INT}$, of the heating system 44 and $T_{MAX}$ are known, an estimated time period needed for the wheel 10 to reach $T_{MAX}$, t, can be calculated as:

$$t = (T_{MAX} - T_0)/r_{INT}$$

A temperature check time $t_{CK}$, at which $T_W$ is compared to $T_{MAX}$, is then calculated as:

$$t_{CK} = t_0 + t.$$

The temperature check time corresponds to the time at which $T_W$ will reach $T_{MAX}$ if the control unit 48 does not reduce the voltage applied to the infared emitters 52 when required. This potential malfunction of the control unit 48 would allow the rapid heating of the wheel 10 to continue, as illustrated by a dashed extension 108 of the heating ramp 101 in FIG. 9 to $T_{MAX}$.

The steps shown in flowchart blocks 111 through 114 in FIG. 10 are the same as the steps shown in blocks 100 and 102 through 104 in FIG. 8. However, in functional block 115 in FIG. 10, $T_W$ is measured at $t_{CK}$, as $T_W(t_{CK})$. In decision block 116, $T_W(t_{CK})$ is compared to $T_{MAX}$. If $T_W(t_{CK})$ is equal to or greater than $T_{MAX}$, the control unit 48 determines that the heating system 44 has malfunctioned. Accordingly, the control sequence branches to functional block 117 to further reduce the heat energy supplied by the infrared heaters 52 before the wheel 10 melts. As an alternate, the heating system 44 can be totally shut down in functional block 117. Then in functional block 118, an alarm is signaled to alert the operators of the problem. If $T_W(t_{CK})$ is less than $T_{MAX}$, the control method proceeds as described above to maintain the wheel 10 within the predetermined temperature range until the solution heat treatment is completed, as shown in decision block 119.

Figure 11:
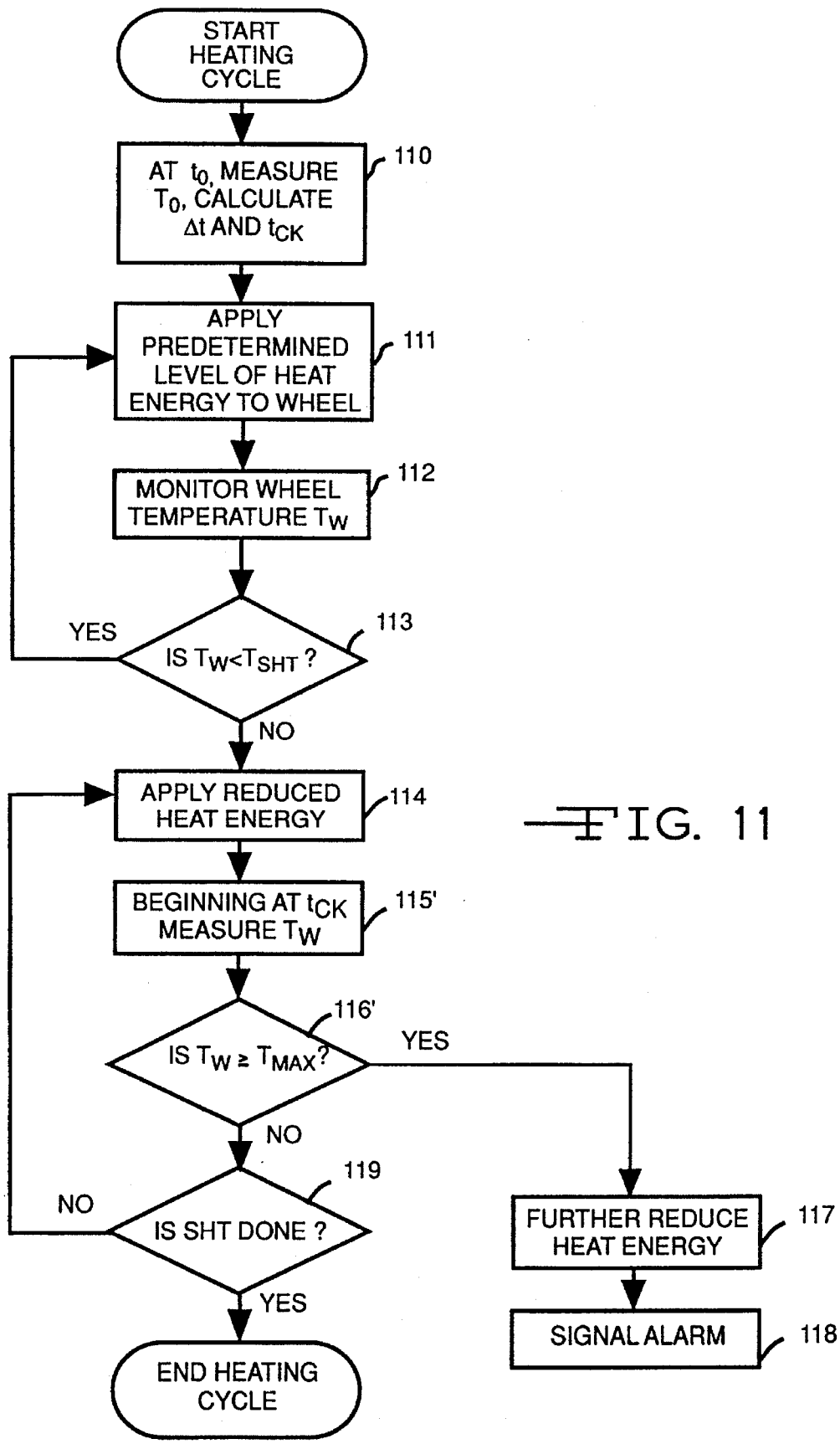
FIG. 11 is a flow chart for another embodiment of the control method shown in FIG. 8.

A third embodiment of the closed loop control method is illustrated by the flow chart shown in FIG. 11. The control method is similar to that shown in FIG. 10, except that $T_W$ is monitored during the time period between $t_{CK}$ to $t_{END}$ to assure that $T_{MAX}$ is not exceeded. Thus, in FIG. 11, functional block 115' indicates that $T_W$ is monitored beginning at $t_{CK}$. In decision block 116', if $T_W$ exceeds $T_{MAX}$ between $t_{CK}$ and $t_{END}$, the control unit 48 branches to functional block 117 to further reduce the heat energy supplied to the wheel 10. As an alternate, the heating system 44 can be totally shut down in functional block 117. This protects the wheel 10 from being overheated if the control unit 48 does not sufficiently reduce the voltage to the emitters 52 when required. $T_W$ can be monitored continuously, at a plurality of times separated by predetermined time intervals, or at a single predetermined time.

An alternate control method to control the heating of the wheel 10 consists of calculating an initial time period for rapid heating of the wheel 10. This initial heating time period is a function of the initial wheel temperature. The initial predetermined level of heat energy is applied to the wheel 10 for the initial heating time period, after which the amount of heat energy is reduced. Because the actual wheel temperature is not monitored during the initial heating time period, there is no feedback involved in the control method. Therefore, the alternate control method constitutes a form of open loop control.

Figure 12:
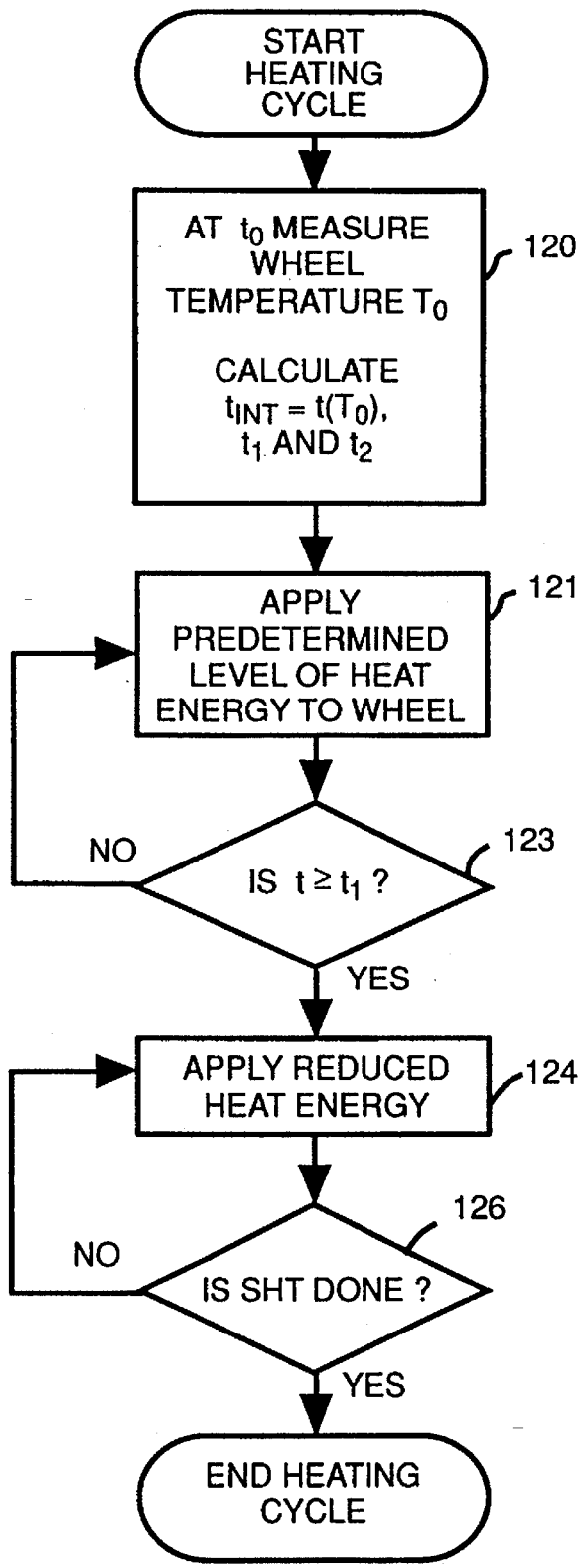
FIG. 12 is a flow chart for an open loop control method for the heating system used in heat treating a metal component according to the invention.
Figure 13:
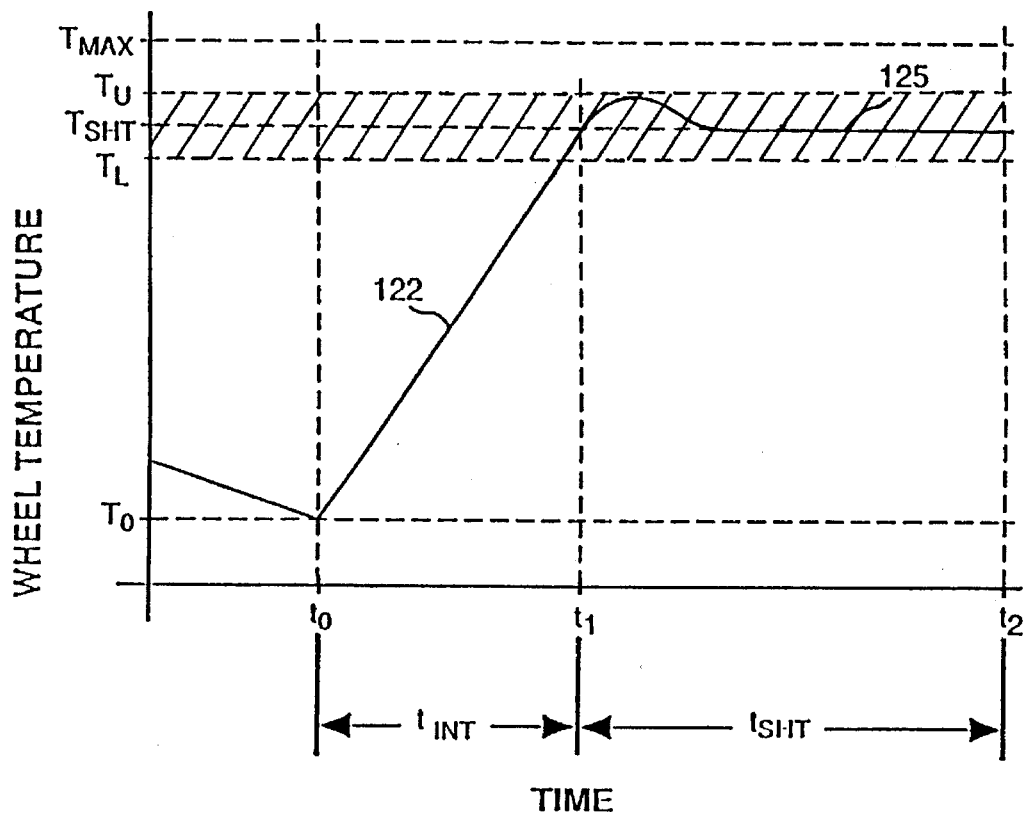
FIG. 13 is a temperature/time graph for the control method shown in FIG. 12.

The above described open loop control method is illustrated by the flow chart shown in FIG. 12 and the temperature/time diagram shown in FIG. 13. FIG. 12 corresponds to the solution heat treatment portion of the graph shown in FIG. 3. For descriptive purposes, the control method is again described by referring to the heating system 44 shown in FIG. 4; however, the control method can be used with other heating systems.

Figure 14:
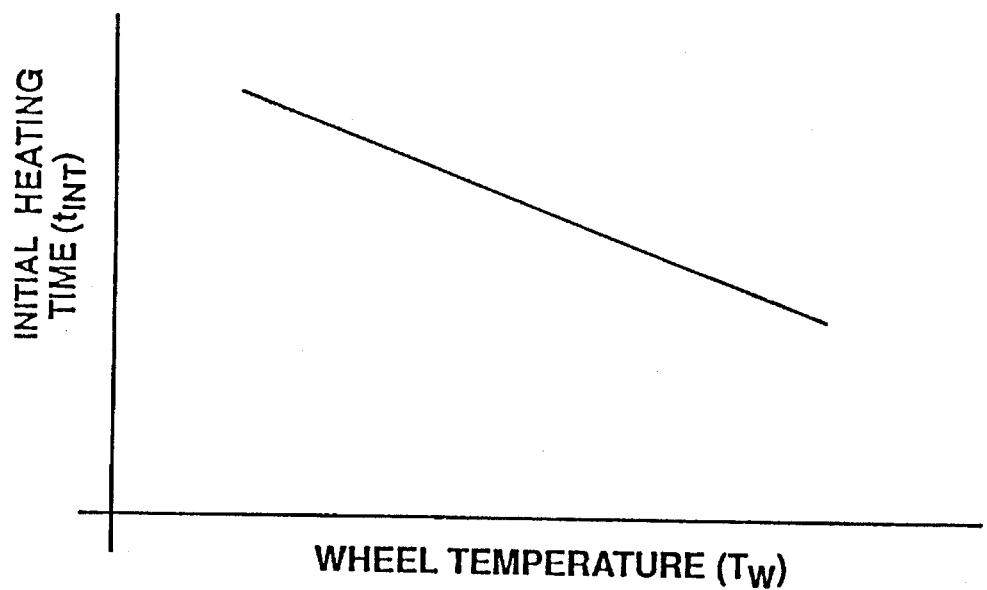
FIG. 14 is a graph illustrating the functional relationship between the initial component heating time and the component temperature for the control method shown in FIG. 12.

As described above, the wheel 10 is loaded onto the indexing carousel at station #1. As shown in functional block 120 in FIG. 12, at $t_0$, the wheel temperature $T_0$ is measured by a temperature sensor 46 and supplied to the control unit 48. An initial wheel heating time period $t_{INT}$ for rapidly heating the wheel 10 to a predetermined temperature, $T_{SHT}$, is then calculated by the control unit 48. The time period $t_{INT}$ is a function of $T_0$. The functional relationship between $t_{INT}$ and $T_0$ is illustrated in FIG. 14 as a time/temperature curve which can be stored in the memory of the control unit 48. As in the closed loop method described above, $T_{SHT}$ is within the SHT temperature range. The SHT temperature range is shown as a horizontal shaded area in FIG. 13 and is bounded by a lower temperature value, $T_L$, and an upper temperature value, $T_U$.

Once $t_{INT}$ is calculated, a termination time, $t_1$, for ending the initial rapid heating of the wheel 10 can be determined (in functional block 120). Based upon the desired solution heat treatment time period, $t_{SHT}$, a termination time, $t_2$, for ending the solution heat treatment can also be calculated. The time period $t_{SHT}$ can be determined from an empirical formula or from actual solution heat treatment experience. During $t_{SHT}$, the wheel 10 continues to be indexed through the heating system 44. The rate of indexing is adjusted to assure that the wheel 10 exits station #6 at $t_2$. Upon completion of the calculations indicated in functional block 120, the wheel 10 is indexed into station #2.

In functional block 121, the control unit 48 causes the heating system 44 to provide an initial predetermined level of heat energy to the wheel 10, causing a rapid wheel temperature rise. This is accomplished by applying a voltage to the infared emitters 52 contained in station #2, beginning at time $t_0$. Typically, the maximum allowable voltage is applied to the emitters 52 to provide a maximum level of heat energy to the wheel 10. This continues until $t_1$ is reached, as determined in decision block 123. The rapid temperature rise is shown by a heating ramp portion 122 of the time/temperature diagram between the times t and $t_1$ in FIG. 13.

When $t_1$ is reached, the control unit 48 causes the voltage applied to the infared emitters 52 to be lowered. This reduces the heat energy provided by the emitters 52 to a lower predetermined level, as shown in function block 124. The lower heating level maintains $T_W$ within the predetermined SHT temperature range, as shown by a generally horizontal portion 125 of the time/temperature diagram in FIG. 13. It is to be appreciated that $T_W$ may exceed $T_U$ for a short transient period following the voltage reduction.

Once the heating level has been reduced, the control unit 48 continues to maintain the wheel 10 within the predetermined temperature range until the solution heat treatment is completed, as shown in decision block 126 in FIG. 12. The production of the wheel 10 then continues as described above.

Figure 15:
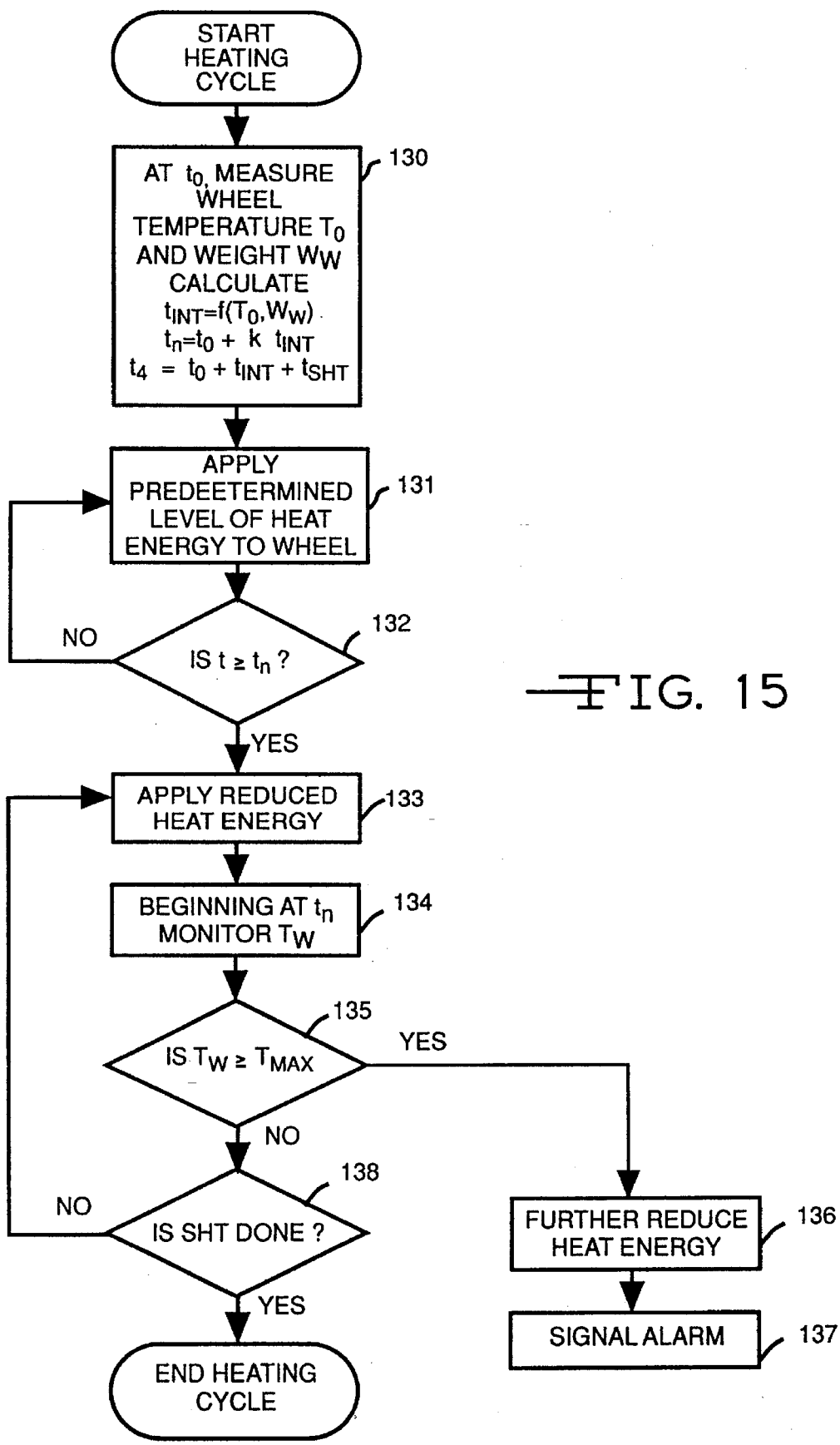
FIG. 15 is a flow chart for an alternate embodiment of the control method shown in FIG. 14.

A second embodiment of the open loop control method is illustrated by the flow chart in shown in FIG. 15. The second embodiment includes comparing the wheel temperature, $T_W$, to a maximum temperature, $T_{MAX}$, after the rapid heating period to preclude overheating the wheel 10. As in the closed loop control method described above, $T_{MAX}$ is selected to be greater than $T_U$ and is illustrated in FIG. 13 by the upper dashed horizontal line. Typically, $TMA_X$ is 5 to 10° F. above $T_U$.

The initial portion of the control method shown in flow chart blocks 130 through 133 in FIG. 15 is the same as shown in blocks 120, 121, 123 and 124 of FIG. 12. Once $t_1$ is reached and the heating level has been reduced in functional block 133, $T_W$ is monitored by temperature sensors 46 in functional block 134 and compared to the maximum temperature $T_{MAX}$ in decision block 135.

If $T_W$ is equal to or greater than $T_{MAX}$, the control unit 48 determines that the heating system 44 has malfunctioned. Accordingly, the control sequence branches to functional block 136 to further reduce the heat energy supplied before the wheel 10 melts. As an alternate, the heating system 44 can be totally shut down in functional block 136. Then in functional block 137, an alarm is signaled to alert the operators of the problem.

If $T_W$ is less than $T_{MAX}$ in decision block 135, the control method proceeds as described above to maintain the emitters 52 at the reduced energy level until the solution heat treatment is completed, as shown by decision block 138. $T_W$ can be monitored continuously, at a plurality of times separated by predetermined time intervals, or at a single predetermined time.

A third embodiment of the open loop control method includes determining $t_{INT}$ as a function of both the initial wheel temperature and the wheel weight, $W_W$. A first scale 140 for weighing the wheel 10 is shown in phantom at station #1 in FIG. 4; however, the scale could be located at station #2 or entirely separate from the heating system 44.

Figure 16:
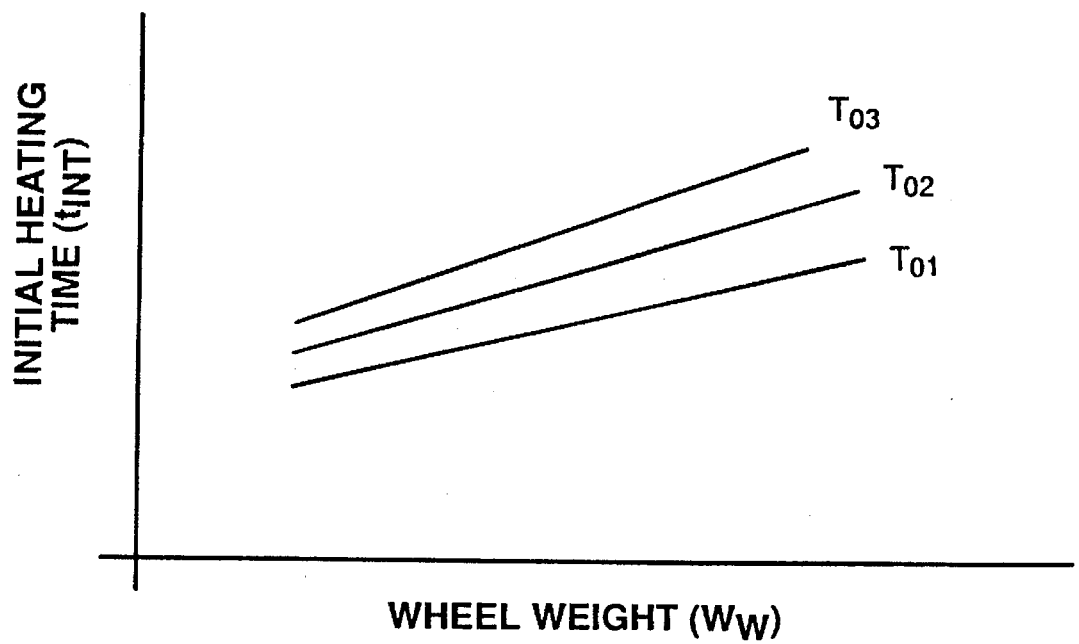
FIG. 16 is a graph illustrating the functional relationship between the initial component heating time and the component temperature and weight for the control method shown in FIG. 12.

The functional relationship between $t_{INT}$ and $T_0$ and $W_W$ is illustrated in FIG. 16 as a family of time/weight curves which can be stored in the memory of the control unit 48. Each time/weight curve corresponds to a particular $T_0$, shown as $T_{01}$, $T_{02}$, and $T_{03}$, and provides $t_{INT}$ as a function of $W_W$. In FIG. 16, $T_{01}$ is greater than $T_{02}$ and $T_{02}$ is greater than $T_{03}$. The three time/weight lines shown in FIG. 16 are meant to be illustrative, more or less time/weight lines can be used in a particular application.

In the third embodiment, the wheel is weighed and both the weight and initial temperature are supplied to the control unit 48. The control unit 48 then uses the curves of FIG. 16 to determine $t_{INT}$. Additionally, only the wheel weight, $W_W$, could be used to determine the initial heating time period, $t_{INT}$.

As indicated above, one or more temperature sensors 46 are used to sense the temperature of the wheel 10. While optical pyrometers are used in the preferred embodiment, an alternative embodiment of the invention contemplates placing a thermocouple 140, as shown in FIG. 5, directly upon a surface of the wheel 10 to directly sense the temperature thereof during testing of the heating system 44. While the thermocouple 140 is shown in FIG. 5 as being mounted upon the face of the wheel 10, it will be appreciated that the thermocouple 140 can be mounted upon other surfaces of the wheel 10. Another embodiment of the invention includes a retractable thermocouple 141 mounted upon each spindle assembly 72. At a specified time in the heat treatment cycle, the thermocouple 141 would be extended into contact with the surface of the wheel 10 to measure the wheel temperature. Once the wheel temperature is measured, the thermocouple 141 would be retracted from the wheel surface.

While the above control methods have been described in terms of solution heat treatment of a wheel, the methods are also applicable to other heat treating processes, such as aging of a wheel. The closed loop and open loop control methods are directly applicable to the aging process by using the temperature sensors 46 in the aging process portion of the heating system 44 to measure $T_W$. A second scale 140 is shown in phantom at station #7, to allow use of the third embodiment of the open loop control method for aging the wheel 10 independently of the control method used for the solution heat treatment of the wheel 10.

The principle and mode of operation of this invention have been described and illustrated in its preferred embodiment. However, it must be understood that the invention may be practiced otherwise than as specifically explained and illustrated without departing from its spirit or scope.

What is claimed is:

1. A method for heat treating a metal component comprising the steps of:
   (a) providing a heat treatment apparatus, the apparatus including a first portion having a plurality of high intensity heaters for rapidly heating the component to a temperature within a heat treatment temperature range, the first portion having a first temperature sensor which is operative to sense the temperature of the component and transmit the data to a control unit, the control unit being responsive to the sensed temperature to control the high intensity heaters, the apparatus also including a second portion having a heat source which is different from the heat source in the first portion for maintaining the component temperature within the heat treatment temperature range;
   (b) loading a component formed from a selected metal into the first portion of the apparatus;
   (c) supplying heat energy to the component from the high intensity heaters at a level to rapidly heat the component;
   (d) sensing the temperature of the component with the first temperature sensor and transmitting the temperature to the control unit;
   (e) monitoring the sensed component temperature with the control unit, the control unit being responsive to the sensed component temperature to reduce the heat energy supplied from the high intensity heaters when the component is heated to the temperature within the heat treatment temperature range;
   (f) moving the component from the first portion of the apparatus to the second portion of the apparatus;
   (g) supplying heat energy to the component in the second portion of the apparatus to maintain the component temperature within the heat treatment temperature range for a heat treatment time period; and
   (h) immediately following the heat treatment time period, quenching the component.

2. The method according to claim 1 wherein the first portion of the apparatus in step (a) includes a plurality of heating stations and in step (c) the component is sequentially indexed through the stations, the component being retained at each station for a time period.

3. The method according to claim 2 wherein the second portion of the apparatus in step (a) includes a plurality of heating stations and in step (g) the component is sequentially indexed through the stations, the component being retained at each station for a time period.

4. The method according to claim 1 further including simultaneously with at least one of steps (c) or (g), rotating the component relative to the supply of heat energy.

5. The method according to claim 1 wherein the apparatus is used to solution heat treat the component and the heat treatment temperature range is the solution heat treatment temperature range for the selected metal.

6. The method according to claim 5 further including, subsequent to step (h), aging the component.

7. The method according to claim 6 wherein the aging includes the steps of:
   (i) providing an artificial aging apparatus, the apparatus including a first portion having a plurality of high intensity heaters for rapidly heating the component to a temperature within an artificial aging temperature range and a second portion for maintaining the component temperature within the artificial aging temperature range;
   (j) loading the metal component into the first portion of the apparatus;
   (k) supplying heat energy to the component from the high intensity heaters at a level to rapidly heat the component to the temperature within the artificial aging temperature range;

(l) moving the component from the first portion of the apparatus to the second portion of the apparatus;

(m) supplying heat energy to the component in the second portion of the apparatus to maintain the component temperature within the artificial aging temperature range for an artificial aging time period; and (n) immediately following the artificial aging time period, quenching the component.

8. The method according to claim 7 further including simultaneously with at least one of steps (k) or (m), rotating the component relative to the supply of heat energy.

9. The method according to claim 1 wherein the component is a vehicle wheel.

10. The method according to claim 9 wherein the wheel is cast.

11. The method according to claim 9 wherein the wheel is forged.

12. The method according to claim 9 wherein the wheel is formed by a semi-solid forging process.

13. The method according to claim 9 wherein the wheel is formed from an aluminum alloy.

14. The method according to claim 1 wherein the high intensity heaters in step (a) are electric infrared emitters.

15. The method according to claim 1 wherein the high intensity heaters in step (a) are gas-fired infrared emitters.

16. The method according to claim 1 wherein the high intensity heaters in step (a) are induction heaters.

17. The method according to claim 1 wherein the second portion of the apparatus in step (a) includes gas-fired convection heating means for maintaining the component temperature.

18. The method according to claim t wherein the second portion of the apparatus in step (a) includes electric resistance heaters for maintaining the component temperature.

19. The method according to claim 1 wherein the second portion of the apparatus in step (a) includes high intensity infrared heaters for maintaining the component temperature.

20. The method according to claim 1 wherein the second portion of the apparatus in step (a) includes induction heaters for maintaining the component temperature.

21. The method according to claim 1 wherein the apparatus in step (a) includes at least one temperature sensor for measuring the temperature of the metal component.

22. The method according to claim 21 wherein the temperature sensor is an optical pyrometer.

23. The method according to claim 22 wherein the temperature sensor is a thermocouple mounted upon the metal component.

24. The method according to claim 22 wherein the temperature sensor is a thermocouple mounted upon the apparatus and further wherein, during one of steps (c) or (g), the thermocouple is extended into contact with the metal component to sense the temperature thereof.

25. The method according to claim 24 wherein, subsequent to sensing the temperature of the metal component, the thermocouple is withdrawn from contact with the metal component.

26. A method for heat treating a metal component comprising the steps of:

(a) forming a metal component from a selected metal, the metal component defining an axis and having a first portion formed perpendicular to the axis and a second portion formed concentric with the axis; and (b) heat treating the metal component by directing infrared radiation from a first group of infrared emitters in a first direction toward the first portion of the metal component and by directing infrared radiation from a second group of infrared emitters in a second direction toward at least a circumferential portion of the second portion of the metal component, the second direction being nonparallel to the first direction, both the first and second groups of infrared emitters being controlled to supply the infrared radiation at a level to rapidly heat the metal component and thereafter maintain the metal component temperature within a heat treatment temperature range for a heat treat time period corresponding to the selected metal.

27. The method according to claim 26 further including, simultaneously with step (b), rotating the metal component relative to the emitters to evenly distribute the infrared radiation therethrough.

28. The method according to claim 27 further including, immediately following step (b), quenching the metal component.

29. The method according to claim 28 further including, immediately following quenching the component, aging the metal component.

30. The method according to claim 1 wherein the apparatus supplied in step (a) has a second temperature sensor mounted in the second portion of the apparatus, the second temperature sensor being operative to sense the temperature of the component and transmit the data to the control unit, the control unit being operable to control the temperature within the second portion of the apparatus and further wherein during step (g) the second temperature sensor senses the temperature of the component and the control unit is responsive to the sensed component temperature to control the heat energy supplied to the second portion of the apparatus to maintain the component temperature within the heat treatment temperature range for the heat treatment time period.

31. A method for heat treating a metal component comprising the steps of:

(a) providing a heat treatment apparatus, the apparatus including a first portion having a plurality of infrared heaters for rapidly heating the component to a temperature within a heat treatment temperature range and a second portion for maintaining the component temperature within the heat treatment temperature range;

(b) loading a component formed from a selected metal into the first portion of the apparatus;

(c) supplying heat energy to the component from the infrared heaters at a level to rapidly heat the component to the temperature within the heat treatment temperature range;

(d) moving the component from the first portion of the apparatus to the second portion of the apparatus;

(e) supplying heat energy to the component in the second portion of the apparatus to maintain the component temperature within the heat treatment temperature range for a predetermined time period; and (f) immediately following the heat treatment time period, quenching the component.

* * * * *

UNITED STATES PATENT AND TRADEMARK OFFICE
CERTIFICATE OF CORRECTION

PATENT NO. : 5,536,337
DATED : July 16, 1996
INVENTOR(S) : Daniel C. Wei

It is certified that error appears in the above-indentified patent and that said Letters Patent is hereby corrected as shown below:

Column 17, Claim 18, Line 1, after "claim", change "t" to -- 1 --.

Signed and Sealed this

Eighth Day of October, 1996

Attest:

BRUCE LEHMAN

*Attesting Officer*     *Commissioner of Patents and Trademarks*